US011856091B2

(12) United States Patent
Onuki et al.

(10) Patent No.: US 11,856,091 B2
(45) Date of Patent: Dec. 26, 2023

(54) DATA DISTRIBUTION SYSTEM, DATA PROCESSING DEVICE, AND PROGRAM

(71) Applicant: Mitsubishi Electric Corporation, Tokyo (JP)

(72) Inventors: Tomohiro Onuki, Tokyo (JP); Motoyuki Ozaki, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 198 days.

(21) Appl. No.: 17/608,149

(22) PCT Filed: Jul. 17, 2019

(86) PCT No.: PCT/JP2019/028062
§ 371 (c)(1),
(2) Date: Nov. 2, 2021

(87) PCT Pub. No.: WO2021/009866
PCT Pub. Date: Jan. 21, 2021

(65) Prior Publication Data
US 2022/0231842 A1 Jul. 21, 2022

(51) Int. Cl.
*H04L 9/08* (2006.01)
*H04L 67/55* (2022.01)
(Continued)

(52) U.S. Cl.
CPC .......... *H04L 9/0833* (2013.01); *H04L 9/3263* (2013.01); *H04L 63/065* (2013.01); *H04L 67/55* (2022.05)

(58) Field of Classification Search
CPC ..... H04L 9/0833; H04L 67/55; H04L 9/3263; H04L 63/065
See application file for complete search history.

(56) References Cited

U.S. PATENT DOCUMENTS 10,827,019 B2 * 11/2020 Rubin ................ H04L 67/562
2008/0107272 A1 5/2008 Carmeli et al.
(Continued)

FOREIGN PATENT DOCUMENTS

CN 109587178 A 4/2019
CN 109937565 A 6/2019
(Continued)

OTHER PUBLICATIONS

Chinese Office Action dated Aug. 19, 2022 in corresponding Chinese Patent Application No. 201980098394.X, 14 pages.
(Continued)

*Primary Examiner* — Techane Gergiso
(74) *Attorney, Agent, or Firm* — XSENSUS LLP

(57) ABSTRACT

A plurality of clients including a platform (200) and at least one client (100) communicate with each other in accordance with a publish-subscribe model. A topic common key manager (260) of the platform (200) provides, to the client (100), a topic common key associated with a topic and being for encryption and decryption of a message directed to the topic. A message manager (270) transmits the message encrypted with the topic common key associated with the topic, and decrypts a received message with the topic common key associated with the topic. A topic common key storage (150) of the client (100) stores the topic common key provided from the platform (200) in association with identification information of the topic. A message manager (170) transmits the message encrypted with the topic common key, and decrypts a received message with the topic common key.

15 Claims, 15 Drawing Sheets

(51) Int. Cl.
*H04L 9/32* (2006.01)
*H04L 9/40* (2022.01)

(56) References Cited

U.S. PATENT DOCUMENTS

| | | | | |
|---|---|---|---|---|
| 2014/0372748 | A1* | 12/2014 | Dixon | H04L 9/3247 |
| | | | | 713/153 |
| 2016/0315922 | A1* | 10/2016 | Chew | H04L 63/061 |
| 2016/0330209 | A1 | 11/2016 | Iacob et al. | |
| 2016/0366111 | A1* | 12/2016 | Smith | H04L 63/102 |
| 2018/0254892 | A1* | 9/2018 | Egorov | H04L 9/0891 |
| 2019/0044939 | A1 | 2/2019 | Smith et al. | |
| 2019/0349733 | A1* | 11/2019 | Nolan | H04L 69/22 |
| 2020/0059357 | A1 | 2/2020 | Fries et al. | |

FOREIGN PATENT DOCUMENTS

| | | |
|---|---|---|
| JP | 2003-338812 A | 11/2003 |
| JP | 2011-151841 A | 8/2011 |
| JP | 2013-118427 A | 6/2013 |
| WO | 2015/101474 A1 | 7/2015 |

OTHER PUBLICATIONS

International Search Report and Written Opinion dated Oct. 15, 2019, received for PCT Application PCT/JP2019/028062, Filed on Jul. 17, 2019, 9 pages including English Translation.

Decision to Grant dated Feb. 18, 2020, received for JP Application 2019-568262, 5 pages including English Translation.

Chinese Office Action dated Jun. 1, 2023 in corresponding Chinese Patent Application No. 201980098394.X (with partial English translation), 16 pages.

Office Action dated Feb. 12, 2023, in corresponding Chinese patent Application No. 201980098394.X, 17 pages with partial English translation.

* cited by examiner

FIG.5

TOPIC COMMON KEY STORAGE  ⌐150

| TOPIC | COMMON KEY FOR TOPIC |
|---|---|
| IDENTIFICATION INFORMATION OF TOPIC T1 | COMMON KEY FOR TOPIC T1 |
| IDENTIFICATION INFORMATION OF TOPIC T2 | COMMON KEY FOR TOPIC T2 |
| ... | ... |

FIG.6

- DESTINATION

TOPIC T1

- TEXT OF MESSAGE

XXXXXXXXXXXXXXXXXXXXX

CLIENT PUBLIC KEY STORAGE

| CLIENT | PUBLIC KEY OF CLIENT |
|---|---|
| IDENTIFICATION INFORMATION OF CLIENT 101 | PUBLIC KEY OF CLIENT 101 |
| IDENTIFICATION INFORMATION OF CLIENT 102 | PUBLIC KEY OF CLIENT 102 |
| ... | ... |

FIG.8

SUBSCRIPTION SETTING STORAGE 250

| TOPIC | CLIENT AUTHORIZED WITH SUBSCRIPTION |
|---|---|
| IDENTIFICATION INFORMATION OF TOPIC T1 | IDENTIFICATION INFORMATION OF CLIENT 101, IDENTIFICATION INFORMATION OF CLIENT 102 |
| IDENTIFICATION INFORMATION OF TOPIC T2 | IDENTIFICATION INFORMATION OF CLIENT 101 |
| ... | ... |

FIG.10

TOPIC COMMON KEY STORAGE  /262

| TOPIC | COMMON KEY FOR TOPIC |
|---|---|
| IDENTIFICATION INFORMATION OF TOPIC T1 | COMMON KEY FOR TOPIC T1 |
| IDENTIFICATION INFORMATION OF TOPIC T2 | COMMON KEY FOR TOPIC T2 |
| ... | ... |

DATA DISTRIBUTION SYSTEM, DATA PROCESSING DEVICE, AND PROGRAM

CROSS-REFERENCE TO RELATED APPLICATION

The present application is based on PCT filing PCT/JP2019/028062, filed Jul. 17, 2019, the entire contents of which are incorporated herein by reference.

TECHNICAL FIELD

The present disclosure relates to a data distribution system, a data processing apparatus, and a program.

BACKGROUND ART

Patent Literature 1 describes an information providing apparatus that transmits content data to a terminal through a mediation server. To prevent leakage of data from the mediation server serving as mediation means, encrypted data is exchanged between an information processing apparatus and the terminal. More specifically, the information processing apparatus and the terminal each have a common key. The information providing apparatus encrypts data to be transmitted with the common key and transmits the encrypted data to the mediation server. The mediation server transmits the data received from the information providing apparatus to the terminal. The terminal decrypts the data received from the mediation server with a topic common key.

Communications through mediation means may use a publish-subscribe model to improve system scalability. In communications in accordance with the publish-subscribe model, a broker serving as the mediation means distributes messages published by publishers to subscribers of the messages. In the publish-subscribe communication model, the messages exchanged through the broker may use encryption.

CITATION LIST

Patent Literature

Patent Literature 1: Unexamined Japanese Patent Application Publication No. 2013-118427

SUMMARY OF INVENTION

Technical Problem

In the structure described in Patent Literature 1, a common key is to be prepared for each combination of an information processing apparatus and a terminal. For example, more data receivers resulting from more terminals cause preparation of common keys for the terminals. Thus, such more terminals as data receivers increase the processing loads of, for example, generating and distributing common keys.

In the communications in accordance with the publish-subscribe model, as in Patent Literature 1, the increased number of subscribers can increase the processing loads of, for example, generating and distributing common keys.

In response to the above issue, an objective of the present disclosure is to reduce processing loads in encrypted communications performed with more data receivers in accordance with a publish-subscribe model.

Solution to Problem

To achieve the above objective, a data distribution system according to an aspect of the present disclosure is a system in which a plurality of clients communicate with each other in accordance with a publish-subscribe model. The plurality of clients include a first client and at least one second client. A topic common key manager included in the first client provides, to the at least one second client, a topic common key associated with a topic specifying a destination of a message and being for encryption and decryption of the message directed to the topic. A message manager included in the first client (i) transmits to the topic the message encrypted with the topic common key associated with the topic and (ii) decrypts, upon receiving the message directed to the topic, the received message with the topic common key associated with the topic. A storage included in the at least one second client stores the topic common key provided from the first client in association with identification information for identification of the topic. A message manager included in the at least one second client (i) transmits to the topic the message encrypted with the topic common key and (ii) decrypts, upon receiving the message directed to the topic, the received message with the topic common key.

Advantageous Effects of Invention

In the data distribution system according to the present disclosure, a plurality of clients communicate with each other in accordance with a publish-subscribe model. The plurality of clients include a first client and at least one second client. The first client provides, to the at least one second client, a topic common key associated with a topic specifying a destination of a message and being for encryption and decryption of the message directed to the topic. The second client (i) transmits to the topic the message encrypted with the topic common key associated with the topic and (ii) decrypts, upon receiving the message directed to the topic, the received message with the topic common key associated with the topic. The plurality of clients perform encryption and decryption of a message with the topic common key associated with each topic. This structure eliminates preparation of a key for each combination of a data provider and a data receiver, thus reducing processing loads in encrypted communications performed with more data receivers.

BRIEF DESCRIPTION OF DRAWINGS

FIG. 5 is a table of example data stored in a topic common key storage according to the embodiment;

FIG. 6 is a diagram of an example message according to the embodiment;

FIG. 8 is a table of example data stored in a subscription setting storage according to the embodiment;

FIG. 10 is a table of example data stored in a topic common key storage according to the embodiment;

DESCRIPTION OF EMBODIMENTS

Embodiments

A data processing apparatus according to an embodiment of the present disclosure is described in detail with reference to the drawings.

Figure 1:
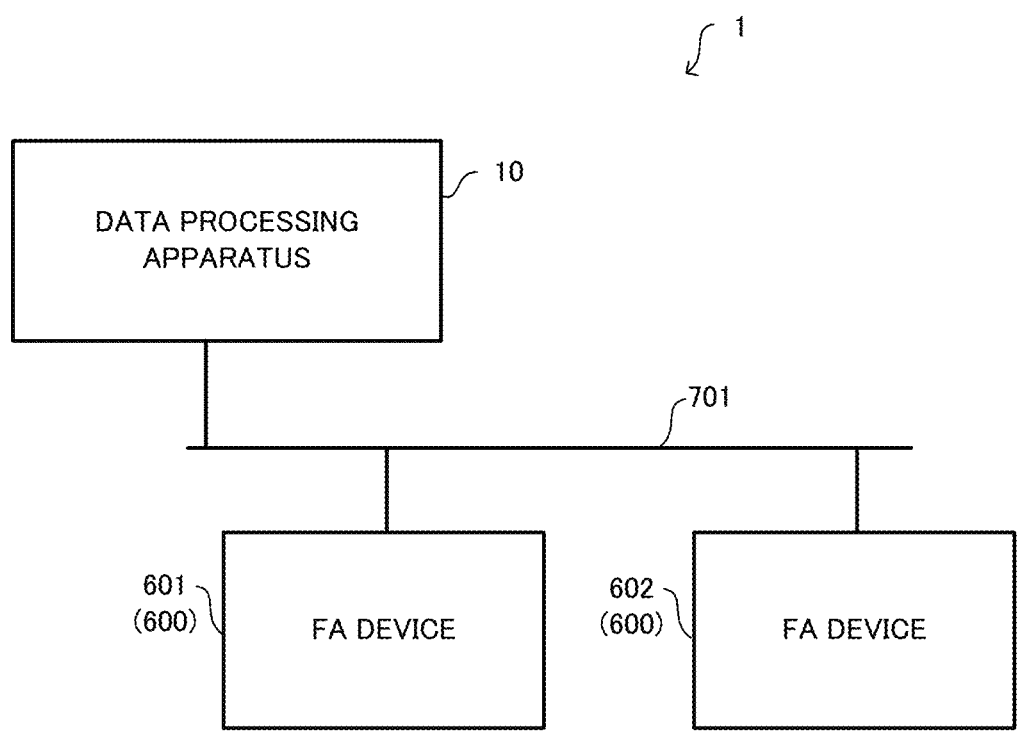
FIG. 1 is a block diagram of a data processing system according to an embodiment of the present disclosure.

As illustrated in FIG. 1, for example, a data processing apparatus 10 according to an embodiment is connected to factory automation (FA) devices 601 and 602 with a network 701 to form a data processing system 1. In the embodiment, the data processing apparatus 10 is, for example, an industrial personal computer (IPC) placed at the same factory as the FA devices 601 and 602.

The data processing apparatus 10 collects data acquired by sensors included in the FA devices 601 and 602. Examples of the sensors included in the FA devices 601 and 602 include a vibration sensor, a temperature sensor, a pressure sensor, and a flow rate sensor. The data processing apparatus 10 collects, for example, data from the FA devices 601 and 602 and performs predetermined processing, such as data processing or analysis, on the collected data. The FA devices 601 and 602 may be hereafter referred to as FA devices 600.

Figure 2:
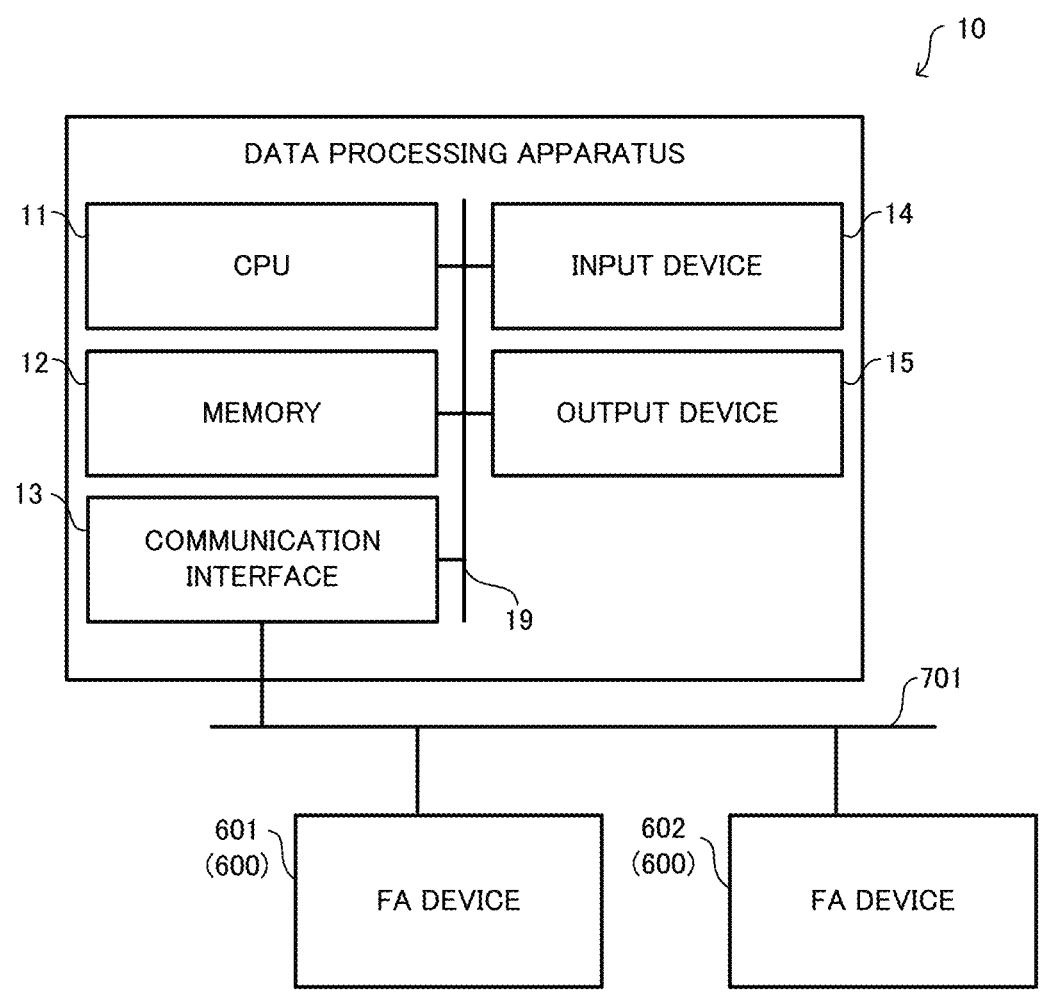
FIG. 2 is a block diagram of a data processing apparatus according to the embodiment, showing the hardware structure.

As illustrated in FIG. 2, the data processing apparatus 10 includes, as hardware components, a central processing unit (CPU) 11 that centrally controls the data processing apparatus 10, a memory 12 that stores various programs and data, a communication interface 13 that communicates with other devices through the network 701, and an input device 14 and an output device 15 serving as user interfaces. The memory 12, the communication interface 13, the input device 14, and the output device 15 are connected to the CPU 11 with a bus 19 to communicate with the CPU 11.

The CPU 11 executes programs stored in the memory 12 to perform the process described later.

The memory 12 includes a volatile memory and a non-volatile memory. The memory 12 stores programs for implementing various functions of the data processing apparatus 10. The memory 12 is used as a work memory for the CPU 11.

The communication interface 13 includes a network interface circuit and communicates with the FA devices 600 through the network 701 under the control of the CPU 11. An example of the network 701 is a network in accordance with field network standards.

The input device 14 includes, for example, an input key and a pointing device. The input device 14 receives operation inputs from a user and outputs signals indicating the operation inputs from the user to the CPU 11. The user is, for example, a manager of the data processing apparatus 10.

The output device 15 includes, for example, a display and a speaker. The output device 15 displays images based on the signals provided from the CPU 11 on the display. The output device 15 outputs, from the speaker, sounds based on the signals provided from the CPU 11.

Figure 3:
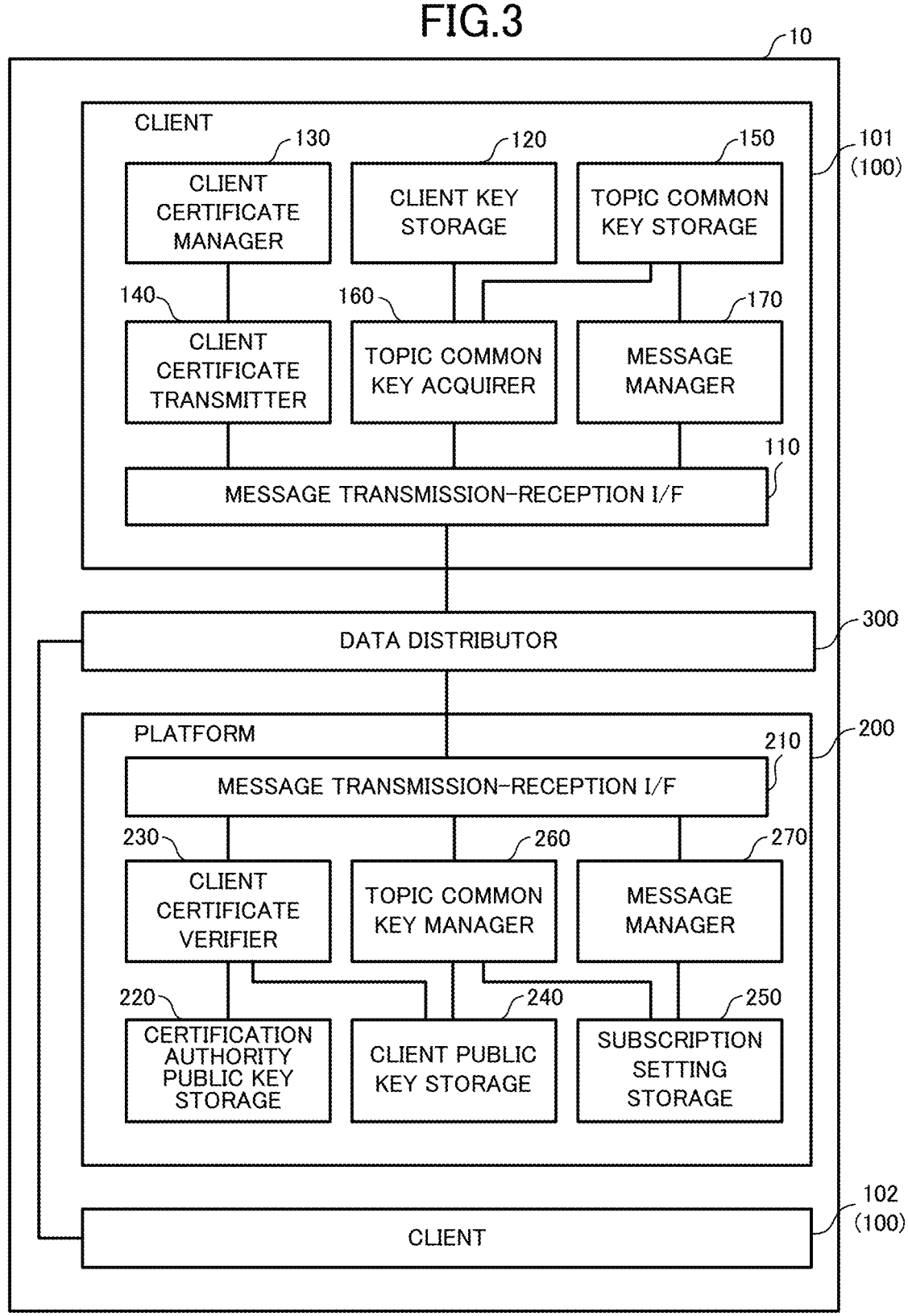
FIG. 3 is a functional block diagram of the data processing apparatus according to the embodiment.

As illustrated in FIG. 3, the data processing apparatus 10 includes clients 101 and 102 that perform predetermined data processing, a platform 200 that controls a series of data processing operations, and a data distributor 300 that mediates data exchange. Although the functional components of the client 102 are not illustrated in FIG. 3, the client 102 has the same functions as the client 101. The clients 101 and 102 may be hereafter collectively referred to as clients 100. Each client 100 is an example of a second client in an aspect of the present disclosure. The platform 200 is an example of a first client in an aspect of the present disclosure. The data distributor 300 is an example of mediation means in an aspect of the present disclosure.

Each client 100 performs predetermined processing. For example, the client 101 collects data from the FA devices 600, and the client 102 analyzes the collected data.

When the clients 100 perform data processing in cooperation with each other, the platform 200 controls a data processing sequence. For example, the platform 200 sets the data processing sequence for the clients 100.

The data distributor 300 mediates data exchange between the clients 100 and the platform 200. The data distributor 300 also mediates data exchange between the clients 100. In the embodiment, the clients 101 and 102, the platform 200, and the data distributor 300 are implemented by applications having the respective functions.

In the embodiment, each functional component in the data processing apparatus 10 provides and receives data in accordance with a publish-subscribe model. In the publish-subscribe model, an application that transmits messages is referred to as a publisher, and an application that receives messages is referred to as a subscriber. An application that mediates data exchange between the publisher and the subscriber is referred to as a broker.

Figure 4:
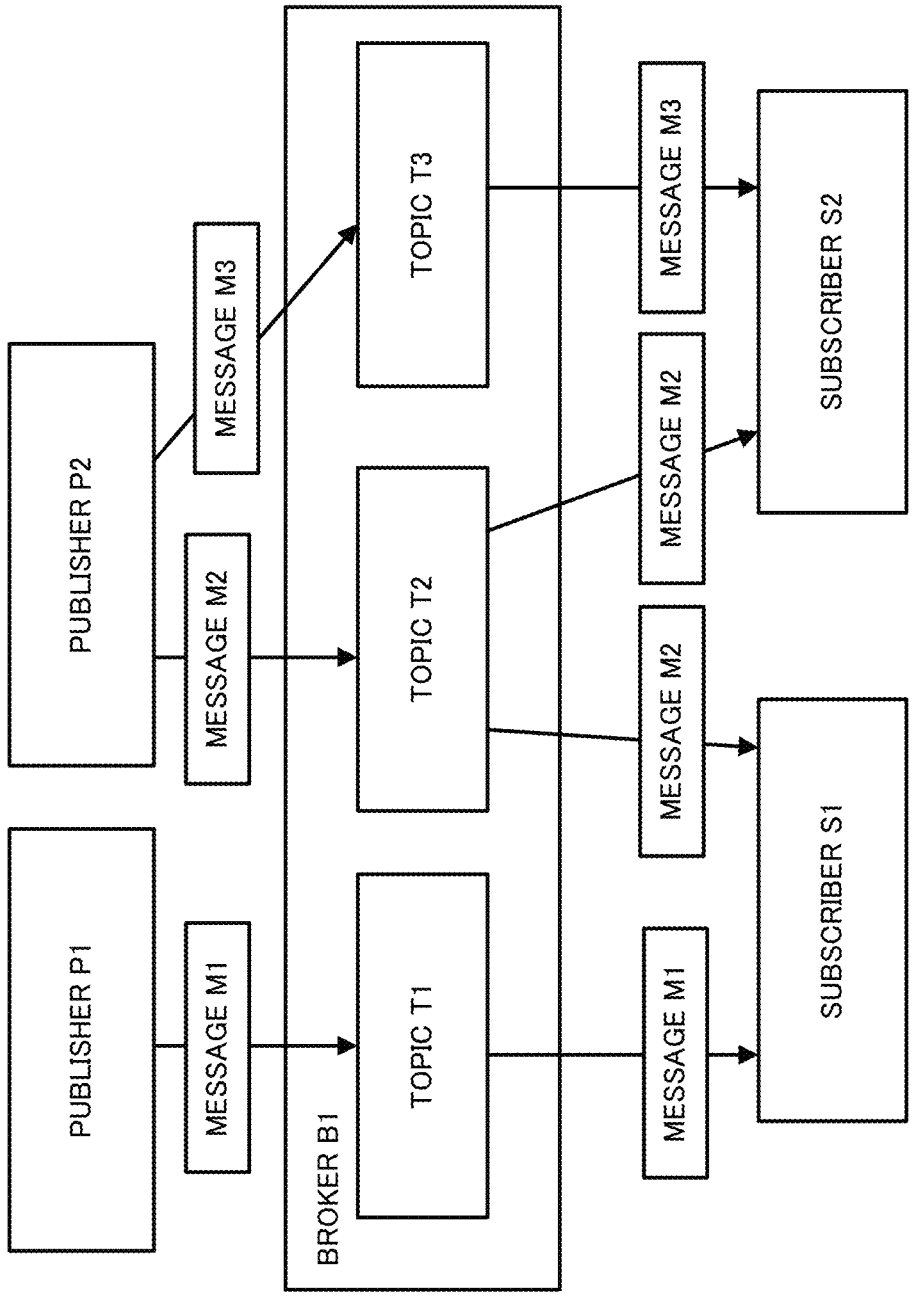
FIG. 4 is a diagram describing messaging in accordance with a publish-subscribe model according to the embodiment.

FIG. 4 shows an example of messaging in accordance with the publish-subscribe model. Publishers P1 and P2 generate messages and transmit the generated messages to a broker B1. Transmission of messages from the publishers P1 and P2 may be referred to as publication. The publishers P1 and P2 can specify any of topics T1, T2, and T3 to publish messages. The topics T1, T2, and T3 indicate the subjects of information included in the messages published by the publisher. Subscribers S1 and S2 specify any of the topics T1, T2, and T3 to request distribution of a message from the broker. Receiving such published messages with the subscribers S1 and S2 may be referred to as subscription. The broker B1 transmits, to the subscribers S1 and S2, messages on the topics subscribed to by the subscribers S1 and S2 respectively. Messages on each topic are thus distributed to the subscribers of the topic. Thus, each topic specifies the destinations of the messages.

In the example illustrated in FIG. 4, the publisher P2 specifies the topic T2 and transmits the message M2 to the broker B1. The subscribers S1 and S2 specify the topic T2 and request subscription from the broker B1. The broker B1 transmits the message M2 of the topic T2 received from the publisher P1 to the subscribers S1 and S2.

In messaging in accordance with the publish-subscribe model, the publisher transmits a message without knowledge of the receiver of the message. Similarly, the subscriber receives a message without knowledge of the transmitter of the message. Employment of the messaging in accordance with publish-subscribe model leads to a low degree of coupling between the publisher and the subscriber, enabling high scalability for the system.

In the data processing apparatus 10 illustrated in FIG. 3, each client 100 operates as a subscriber or a publisher. The platform 200 operates as a publisher or a subscriber. The data distributor 300 operates as a broker. Each client 100 and the platform 200 can operate as both a publisher and a subscriber for any topic. For example, the client 101 collects data from the FA devices 600, and the client 102 processes the collected data. The client 101 may operate as a publisher, and the client 102 may operate as a subscriber. The client 101 transmits the collected data to the data distributor 300 serving as a broker. The data distributor 300 distributes data to the client 102 serving as a subscriber. The client 102 processes the received data.

In the embodiment, before distribution of messages, the platform 200 sets a topic with the data distributor 300 that operates as a broker based on, for example, the subscription setting preset by a user. For example, the platform 200 sets the topic at activation of the data distributor 300. The platform 200 also sets a parameter that specifies the topic to be subscribed to for each client 100 when, for example, the client 100 is activated. Each client 100 requests subscription of the topic from the data distributor 300 based on the set parameter.

In the embodiment, each of the client 100 and the platform 200, when operating as a publisher, transmits a message including encrypted data. Each of the client 100 and the platform 200, when operating as a subscriber, decrypts data included in the received message. For encryption and decryption of data on the same topic, the same key is used. Before transmission or reception of a message, the platform 200 distributes a key associated with each topic to the publisher and the subscriber of the topic. The key associated with each topic is hereafter referred to as a topic common key. The publisher of a topic encrypts a topic message to be published with a topic common key associated with the topic. The subscriber of the topic decrypts the received message with the topic common key associated with the topic.

The publisher encrypts data before transmission to avoid, for example, the situation described below. When an unauthorized client 100 is added to the data processing apparatus 10 and the setting for the message destination of the data distributor 300 is changed for each topic, the unauthorized client 100 can receive or transmit a message. To avoid this, the platform 200 verifies the client 100 before transmission or reception of messages and provides the topic common key to authorized clients 100. For example, the platform 200 transmits a message including data encrypted with a topic common key. The client 100 receiving the message including the encrypted data through the data distributor 300 can decrypt the data included in the message when having the topic common key corresponding to the topic. The unauthorized client 100 without the topic common key is unable to perform encryption and decryption of the data.

The functions of the clients 100 and the platform 200 for the above process are described.

As illustrated in FIG. 3, each client 100 includes a message transmission-reception interface (I/F) 110, a client key storage 120, a client certificate manager 130, a client certificate transmitter 140, a topic common key storage 150, a topic common key acquirer 160, and a message manager 170.

The message transmission-reception I/F 110 is an interface that transmits and receives messages to and from the data distributor 300. The functions of the message transmission-reception I/F 110 are implemented by the CPU 11 illustrated in FIG. 2.

The client key storage 120 illustrated in FIG. 3 stores a public key and a secret key of the client 100. The client 100 generates the public key and the secret key of the client 100 in, for example, a predetermined manner immediately after being activated and stores the public key and the secret key in the client key storage 120. Although described in detail later, the public key of the client 100 is used by the platform 200 to provide a topic common key to the client 100. The functions of the client key storage 120 are implemented by the memory 12 illustrated in FIG. 2.

The client certificate manager 130 illustrated in FIG. 3 stores a client certificate issued by a certification authority. The client certificate certifies that the client 100 is an authorized client. The certificate is an electronic certificate issued by the certification authority. The certification authority may be a public certification authority that has passed examination under an auditing firm, or a private certification authority such as a provider of the data processing apparatus 10. The client certificate is preinstalled in an application that implements the functions of the client 100. The functions of the client certificate manager 130 are implemented by the CPU 11 and the memory 12 illustrated in FIG. 2.

The client certificate transmitter 140 illustrated in FIG. 3 transmits a client certificate stored in the client certificate manager 130 to the data distributor 300 through the message transmission-reception I/F 110. For example, the client certificate transmitter 140 specifies the topic to be subscribed to and transmits a message including the client certificate to the data distributor 300. The message including the client certificate is generated in, for example, a predetermined format.

The message including the client certificate is transmitted to the platform 200 through the data distributor 300. For example, a topic for providing the client certificate to the platform 200 may be set. Each client 100 may publish a message including the client certificate to the topic. The platform 200 may be set as a subscriber of the topic satisfying the conditions for acquiring the client certificate. For example, the platform 200 may be set as a subscriber of at least one of topics subscribed to by each client 100.

Although the client 100 may subscribe to two or more topics, the client 100 may transmit the client certificate once to the platform 200. For example, the client certificate transmitter 140 may transmit the client certificate to the destination of a first one of the subscription topics specified by the platform 200. The client certificate transmitter 140 is an example of client-certificate transmission means in an aspect of the present disclosure. The functions of the client certificate transmitter 140 are implemented by the CPU 11 illustrated in FIG. 2.

The topic common key storage 150 illustrated in FIG. 3 stores the topic common key provided from the platform 200. As illustrated in FIG. 5, the topic common key storage 150 stores each topic common key in association with information that identifies the topic. The functions of the topic common key storage 150 are implemented by the memory 12 illustrated in FIG. 2.

Upon receiving a message including a topic common key from the data distributor 300 through the message transmission-reception I/F 110, the topic common key acquirer 160 illustrated in FIG. 3 stores the topic common key in the topic common key storage 150. The topic common key acquirer 160 can determine whether the received message includes the topic common key, based on, for example, the message format. The topic common key is encrypted with the public key of the client 100. Thus, the topic common key acquirer 160 decrypts the received topic common key with a secret key of the client 100 stored in the client key storage 120 to acquire the topic common key. The topic common key acquirer 160 stores the topic common key in the topic common key storage 150 together with information for identification of the topic.

Two or more clients 100 may subscribe to the same topic. Although described later in detail, the platform 200 encrypts the topic common key with the public keys of the respective clients 100 and transmits the message including the encrypted topic common key to the data distributor 300 using the topic as the destination. Thus, the topic common key acquirer 160 in each client 100 may receive a message including a topic common key for another client 100. However, the topic common key acquirer 160 cannot decrypt the topic common key for another client 100 with the public key of the topic common key acquirer 160, and thus abandons the message. The functions of the topic common key acquirer 160 are implemented by the CPU 11 illustrated in FIG. 2.

The message manager 170 illustrated in FIG. 3 manages message transmission and reception. More specifically, upon receiving a message from the data distributor 300 through the message transmission-reception I/F 110, the message manager 170 decrypts data included in the message with the topic common key stored in the topic common key storage 150. As illustrated in FIG. 6, the message received by the message manager 170 includes information indicating the destination of the message and the text of the message. Information for identification of the topic is specified as the destination. For example, the message manager 170 provides decrypted data to a non-illustrated data processor included in the client 100. The data processor performs predetermined processing on the decrypted data.

The message manager 170 processes messages in a predetermined format alone. For example, the message manager 170 may receive a message including a client certificate transmitted by another client 100 that subscribes to the same topic. In this case, the message manager 170 abandons the message. The message manager 170 is an example of second message management means in an aspect of the present disclosure. The functions of the message manager 170 are implemented by the CPU 11 illustrated in FIG. 2.

When the client 100 illustrated in FIG. 3 operates as a publisher, the message manager 170 encrypts processed data provided from the non-illustrated data processor with the topic common key stored in the topic common key storage 150. The message manager 170 generates a message including encrypted data and transmits the message to the data distributor 300 through the message transmission-reception I/F 110.

As illustrated in FIG. 3, the platform 200 includes a message transmission-reception I/F 210, a certification authority public key storage 220, a client certificate verifier 230, a client public key storage 240, a subscription setting storage 250, a topic common key manager 260, and a message manager 270.

The message transmission-reception I/F 210 is an interface that transmits and receives messages to and from the data distributor 300. The functions of the message transmission-reception I/F 210 are implemented by the CPU 11 shown in FIG. 2.

The certification authority public key storage 220 illustrated in FIG. 3 stores a public key of the certification authority made public by the certification authority. The public key of the certification authority is preinstalled in an application that implements the functions of the platform 200. The functions of the certification authority public key storage 220 are implemented by the memory 12 shown in FIG. 2.

The client certificate verifier 230 illustrated in FIG. 3 verifies the signature affixed to the client certificate when the message received from the data distributor 300 through the message transmission-reception I/F 210 includes the client certificate. The client certificate verifier 230 can determine whether the received message includes the client certificate based on, for example, the message format.

More specifically, the client certificate verifier 230 decrypts the signature of the certification authority included in the client certificate with the public key of the certification authority stored in the certification authority public key storage 220 to acquire a hash value. The client certificate verifier 230 also generates a hash value based on the identification information and the public key of the client 100 included in the client certificate. The client certificate verifier 230 determines whether the hash value acquired from the signature of the certification authority is identical to the hash value generated based on the identification information and the public key of the client 100. When determining that the two hash values are identical, the client certificate verifier 230 determines that the signature affixed to the client certificate is successfully verified, and stores the public key of the client 100 included in the client certificate into the client public key storage 240 in association with the identification information. When the signature affixed to the client certificate is successfully verified, the client certificate verifier 230 notifies the topic common key manager 260 of the success. The functions of the client certificate verifier 230 are implemented by the CPU 11 illustrated in FIG. 2.

Figure 7:
FIG. 7 is a table of example data stored in a client public key storage according to the embodiment.

The client public key storage 240 illustrated in FIG. 3 stores the public key of the client 100. As shown in FIG. 7, the client public key storage 240 stores the public key of each client 100 in association with the identification information. The functions of the client public key storage 240 are implemented by the memory 12 illustrated in FIG. 2.

The subscription setting storage 250 illustrated in FIG. 3 stores information about the client 100 authorized to subscribe to the topic. As illustrated in FIG. 8, the subscription setting storage 250 stores information for identification of the topic in association with the identification information for identification of the client 100. In the illustrated example, the clients 101 and 102 are authorized to subscribe to the message on the topic T1. The client 101 is authorized to subscribe to the message on the topic T2. The user prestores data to be used into the subscription setting storage 250. The functions of the subscription setting storage 250 are implemented by the memory 12 illustrated in FIG. 2.

Figure 9:
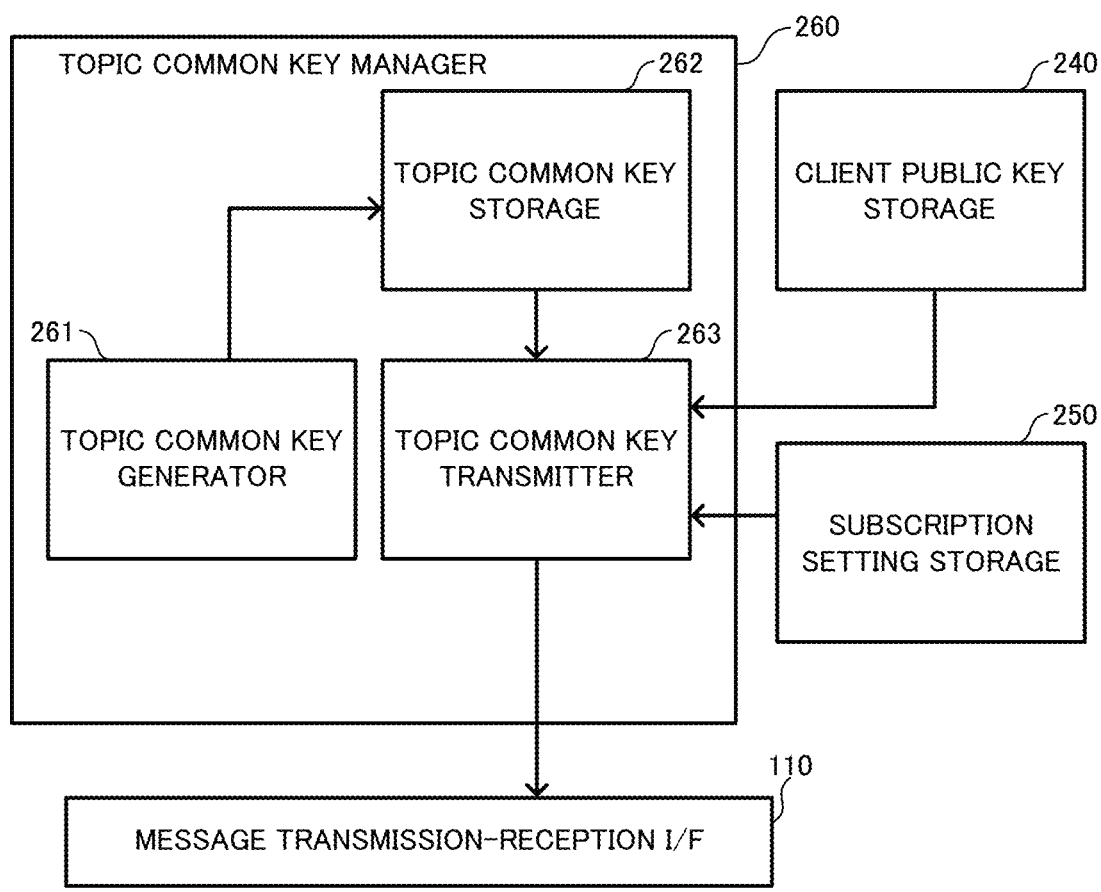
FIG. 9 is a functional block diagram of a topic common key manager according to the embodiment.

The topic common key manager 260 illustrated in FIG. 3 generates the topic common key before transmission or reception of messages and provides the topic common key to the client 100. As illustrated in FIG. 9, the topic common key manager 260 includes a topic common key generator 261, a topic common key storage 262, and a topic common key transmitter 263. The functions of the topic common key manager 260 are implemented by the CPU 11 and the memory 12 illustrated in FIG. 2.

The topic common key generator 261 generates a topic common key for each topic. The key may be generated in any manner. For example, the topic common key generator

261 may calculate a hash value based on information indicating the date and time for generating the topic common key, generate a random number, and combine the hash value and the random number to generate a topic common key. The topic common key generator 261 may calculate a hash value based on information for identification of the topic and information indicating the date and time, generate a random number, and combine the hash value and the random number to generate a topic common key. The topic common key generator 261 may use an encryption algorithm to generate a topic common key.

The topic common key generator 261 stores the generated topic common key in association with information that identifies the topic into the topic common key storage 262. The topic common key generator 261 generates a topic common key for each topic immediately after, for example, activation of the platform 200. When a new topic is formed by a user, the topic common key generator 261 generates a topic common key corresponding to the topic. Information about the topic including the identification information of the formed topic is prestored by the user into the memory 12.

The topic common key storage 262 stores the topic common key generated by the topic common key generator 261 for each topic. As illustrated in FIG. 10, the topic common key storage 262 stores each topic common key in association with information that identifies the corresponding topic. The topic common key storage 262 of the platform 200 stores the topic common keys for all the topics in the data processing apparatus 10. The topic common key for the topic T1 is an example of a first common key in an aspect of the present disclosure. The topic common key for the topic T2 is an example of a second common key in an aspect of the present disclosure.

The topic common key transmitter 263 illustrated in FIG. 9 provides the topic common keys stored in the topic common key storage 262 to the clients 100 authorized to subscribe to the topics.

More specifically, upon receiving a notification indicating the successful verification of the signature affixed to the client certificate from the client certificate verifier 230 illustrated in FIG. 3, the topic common key transmitter 263 specifies the topic subscribed to by the client 100 based on the data stored in the subscription setting storage 250. As illustrated in FIG. 9, the topic common key transmitter 263 acquires the topic common key for the specified topic from the topic common key storage 262. The topic common key transmitter 263 acquires the client public key of the client 100 from the client public key storage 240. The topic common key transmitter 263 encrypts the topic common key with the client public key, generates a message including the encrypted topic common key, specifies the topic, and transmits the message to the data distributor 300 illustrated in FIG. 3 through the message transmission-reception I/F 110.

When each client 100 subscribes to multiple topics, the topic common key transmitter 263 distributes the topic common keys in the manner described below. For example, as illustrated in FIG. 8, the client 101 subscribes to the topics T1 and T2. The topic common key transmitter 263 acquires the topic common keys of the topics T1 and T2 from the topic common key storage 262 illustrated in FIG. 5 and acquires the public key of the client 101 from the client public key storage 240 illustrated in FIG. 7.

The topic common key transmitter 263 encrypts the topic common key for the topic T1 with the public key of the client 101 and transmits a message including the encrypted topic common key for the topic T1 to the data distributor 300 using the topic T1 as the destination. The topic common key transmitter 263 also encrypts the topic common key for the topic T2 with the public key of the client 101 and transmits a message including the encrypted topic common key for the topic T2 to the data distributor 300 using the topic T2 as the destination.

The topic common key transmitter 263 may collectively transmit the topic common keys to the same client 100. The topic common key transmitter 263 may encrypt the topic common keys of the topics T1 and T2 with the public key of the client 101 and transmit a message including the encrypted data to the data distributor 300. For example, the topic common key transmitter 263 may specify one of multiple topics with the smallest topic identification information value, for example the topic T1, and transmit the message including the topic common key to the data distributor 300.

The message manager 270 illustrated in FIG. 3 manages message transmission and reception. More specifically, upon receiving a message from the data distributor 300 through the message transmission-reception I/F 210, the message manager 270 decrypts data included in the message with the topic common key stored in the topic common key manager 260. For example, the message manager 270 provides the decrypted data to a non-illustrated data processor included in the platform 200. The data processor performs predetermined processing on the data.

The message manager 270 encrypts the data for publication with the topic common key stored in the topic common key manager 260. The message manager 270 generates a message including encrypted data and transmits the message to the data distributor 300 through the message transmission-reception I/F 210. The message manager 270 is an example of first message management means in an aspect of the present disclosure. The functions of the message manager 270 are implemented by the CPU 11 illustrated in FIG. 2.

Upon receiving a message using a topic as a destination, the data distributor 300 illustrated in FIG. 3 transmits the message to the subscriber of the topic.

Figure 11:
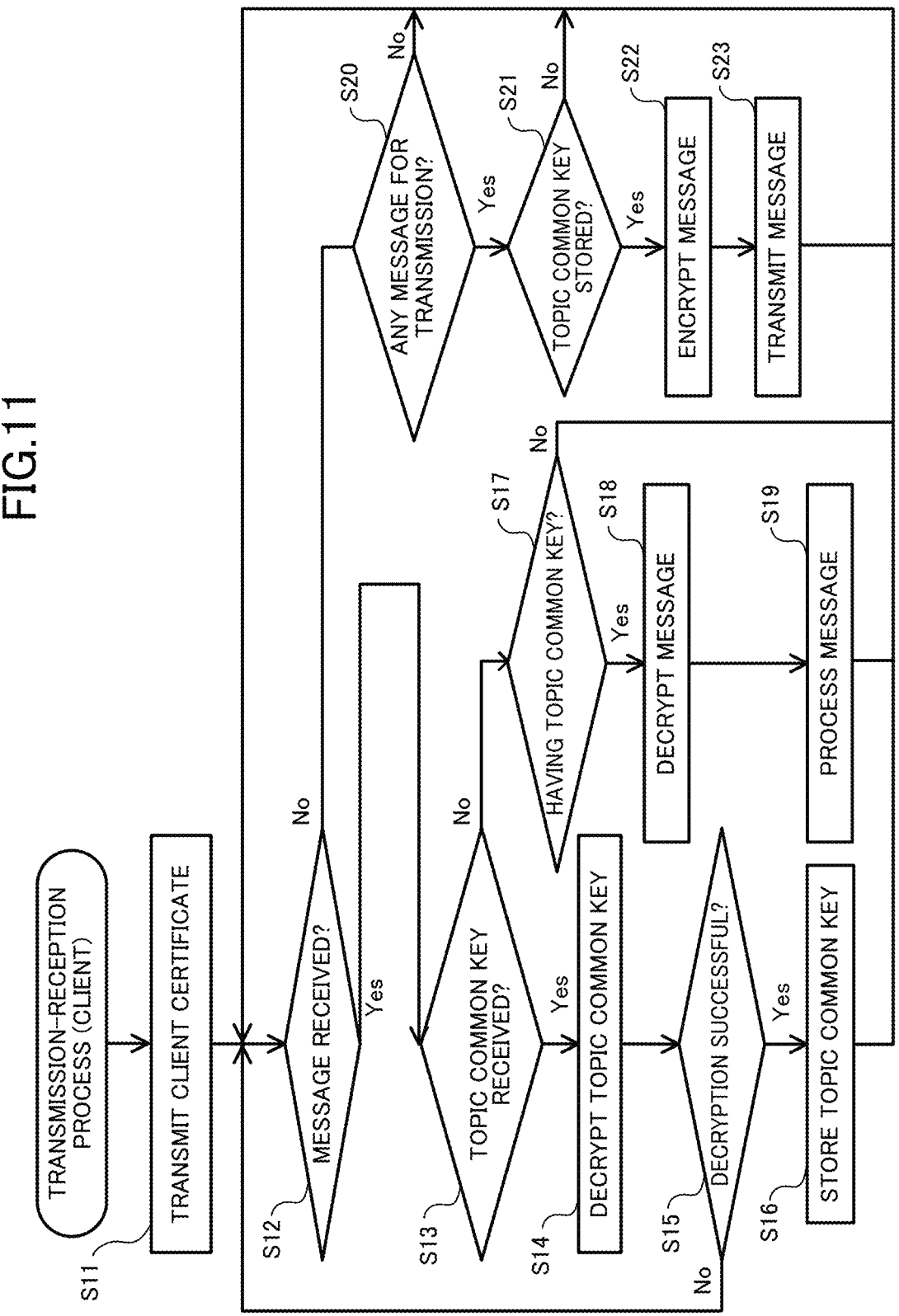
FIG. 11 is a flowchart of a transmission-reception process performed by a client according to the embodiment.

A series of processes performed by the client 100 to transmit and receive messages is described. When activated, the client 100 performs a transmission-reception process shown in FIG. 11. For example, the client 100 is activated upon a user operation performed on the input device 14. The client 100 has a client certificate in advance.

The client certificate transmitter 140 transmits a message including the client certificate stored in the client certificate manager 130 to the data distributor 300 (step S11). Upon receiving a message from the data distributor 300 through the message transmission-reception I/F 110 (Yes in step S12), the topic common key acquirer 160 determines whether the received message includes the topic common key (step S13). When determining that the received message includes the topic common key (Yes in step S13), the topic common key acquirer 160 decrypts the encrypted topic common key included in the message with the secret key of the client 100 stored in the client key storage 120 (step S14). When the decryption is successful (Yes in step S15), the topic common key acquirer 160 stores the decrypted topic common key into the topic common key storage 150 together with the topic identification information (step S16). When the decryption fails in step S15 (No in step S15), the topic common key acquirer 160 abandons the message, and performs the process in step S12 again.

When the topic common key acquirer 160 determines that the received message does not include the topic common key in step S13 (No in step S13), the message manager 170 determines whether the client 100 has the topic common key for the topic of the received message (step S17). When the topic common key storage 150 stores the topic common key, the message manager 170 determines that the client 100 has the topic common key (Yes in step S17), decrypts the data included in the message with the topic common key (step S18), and performs predetermined processing on the received data (step S19).

For the client 100 operating as a publisher, the message manager 170, without receiving a message from the data distributor 300 (No in step S12), determines whether the topic common key storage 150 stores the topic common key (step S21) at publication of data (Yes in step S20). When the topic common key storage 150 stores the topic common key (Yes in step S21), the message manager 170 encrypts data to be transmitted with the topic common key (step S22) and transmits a message including the encrypted data to the data distributor 300 through the message transmission-reception I/F 110 (step S23). The client 100 performs the transmission-reception process in this manner.

A process of distributing the topic common key and transmitting and receiving a message performed by the platform 200 is described. When activated, the platform 200 performs the transmission-reception process illustrated in FIG. 12. For example, the platform 200 is activated upon a user operation performed on the input device 14. The certification authority public key storage 220 of the platform 200 prestores the public key of the certification authority in advance. The platform 200 generates the topic common key for each topic and stores the topic common key into the topic common key storage 150.

Figure 12:
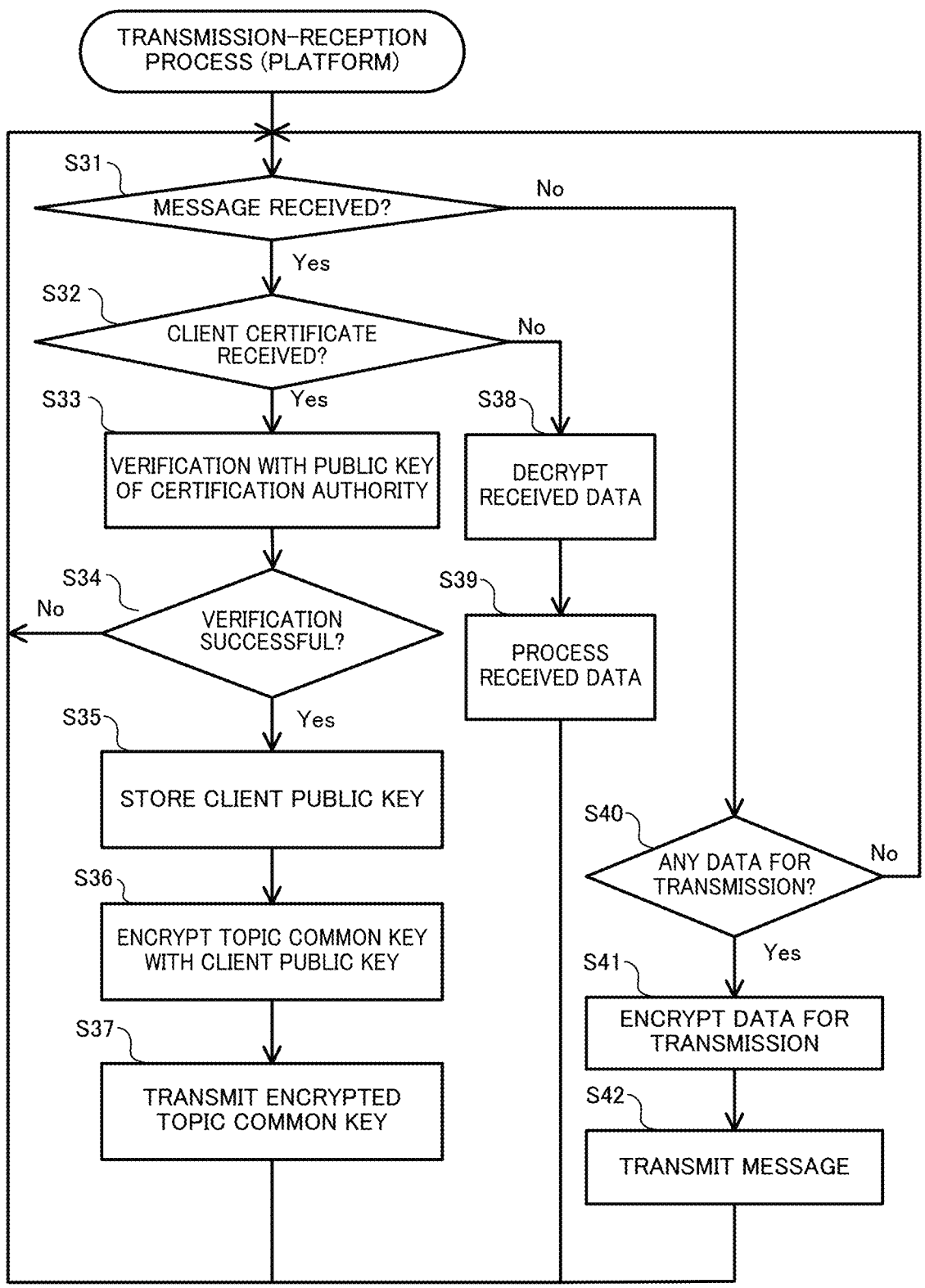
FIG. 12 is a flowchart of a transmission-reception process performed by a platform according to the embodiment.

As illustrated in FIG. 12, upon receiving a message from the data distributor 300 through the message transmission-reception I/F 210 (Yes in step S31), the client certificate verifier 230 determines whether the received message includes the client certificate (step S32).

When determining that the received message includes the client certificate (Yes in step S32), the client certificate verifier 230 verifies the signature affixed to the client certificate included in the message (step S33). More specifically, the client certificate verifier 230 decrypts the signature of the certification authority included in the client certificate with the public key of the certification authority stored in the certification authority public key storage 220 and acquires a hash value. The client certificate verifier 230 also generates a hash value based on the identification information and the public key of the client 100 included in the client certificate. When the hash value acquired from the signature of the certification authority is identical to the hash value generated based on the identification information and the public key of the client 100, the client certificate verifier 230 determines that the signature affixed to the client certificate is successfully verified.

When the signature affixed to the client certificate is successfully verified (Yes in step S34), the client certificate verifier 230 stores the client public key acquired from the client certificate into the client public key storage 240 (step S35).

Subsequently, the topic common key transmitter 263 of the topic common key manager 260 encrypts the topic common key to be transmitted to the client 100 with the client public key (step S36). More specifically, the topic common key transmitter 263 specifies the topic to which the client 100 is authorized to subscribe based on the data stored in the subscription setting storage 250 and acquires the topic common key for the topic from the topic common key storage 262. The topic common key transmitter 263 acquires the public key of the client 100 from the client public key storage 240 and encrypts the topic common key with the public key of the client 100.

The topic common key transmitter 263 transmits a message including the encrypted topic common key to the data distributor 300 through the message transmission-reception I/F 110 (step S37).

When the client certificate verifier 230 determines that the received message does not include the client certificate in step S32 (No in step S32), the message manager 270 acquires the topic common key for the topic of the received message from the topic common key storage 262 and decrypts the data included in the received message with the topic common key (step S38). The message manager 270 then performs predetermined processing on the received data (step S39).

For the platform 200 operating as a publisher, the message manager 270, without receiving a message from the data distributor 300 (No in step S31), encrypts data to be transmitted with the topic common key stored in the topic common key storage 262 (step S41) at publication of data (Yes in step S40) and transmits a message including the encrypted data to the data distributor 300 through the message transmission-reception I/F 210 (step S42).

As described above, in the data processing apparatus 10 according to the embodiment, each client 100 and the platform 200 that publish and subscribe to the same topic encrypt and decrypt a message using a topic common key generated for each topic. The structure according to the embodiment does not involve preparation of a key for each combination of a publisher and a subscriber. For example, adding an application for specific data processing to the data processing apparatus 10 may increase the number of subscribers of a topic. In this case, the topic common key already generated may be provided to the added subscribers, rather than keys being generated for the increased number of subscribers.

The topic common key is generated for each topic. The processing loads of, for example, key generation or key management of the platform 200 are thus lower than in the structure in which a key is prepared for each combination of a publisher and a subscriber.

Before providing the topic common key to the client 100, the platform 200 verifies the signature affixed to the client certificate submitted by the client 100 to determine whether the client 100 is an authorized client. When the verification fails, the platform 200 does not provide the topic common key to the client 100. The platform 200 with such a structure allows the authorized client 100 alone to acquire the topic common key used to subscribe to the topic.

In the embodiment, the client certificate stored in the client certificate manager 130 is preinstalled in an application that implements the functions of the client 100. In the data processing apparatus 10 with such a structure without connection to an external network, the platform 200 can verify the client 100. Some computers used in the field of factory automation are not connected to an external network for, for example, ensuring security. The data processing apparatus 10 need not track a certificate chain without connection to an external network. This structure can thus avoid security concerns resulting from connection to an external network.

Modification 1

Figure 13:
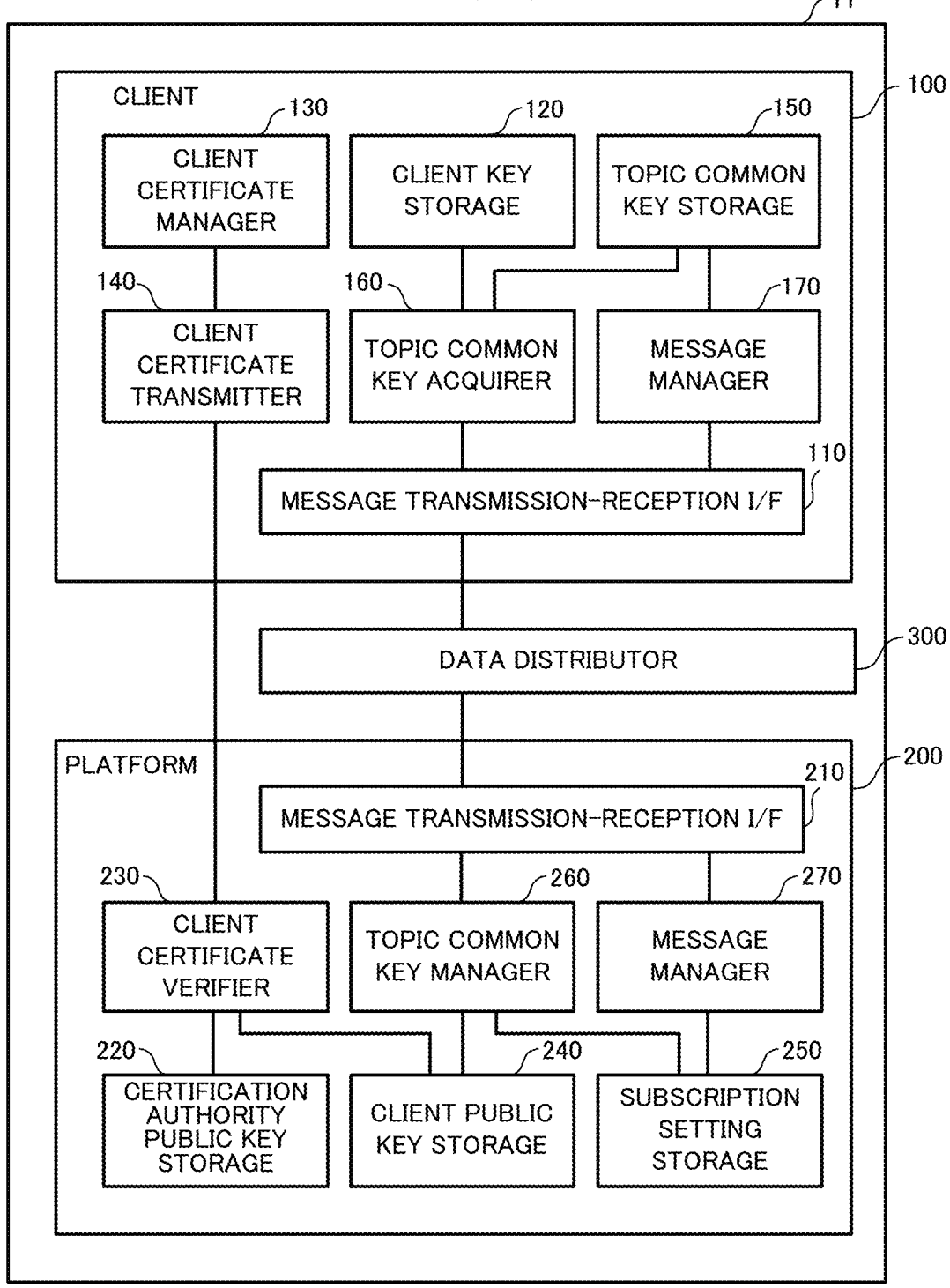
FIG. 13 is a functional block diagram of a data processing apparatus according to Modification 1.

In the embodiment, the client 100 transmits the client certificate to the platform 200 through the data distributor 300, but this example is not limitative. As illustrated in FIG. 13, the client certificate transmitter 140 of the client 100 and the client certificate verifier 230 of the platform 200 may directly communicate with each other without the data distributor 300. The client certificate transmitter 140 directly transmits a file including the client certificate to the client certificate verifier 230. The client certificate transmitter 140 and the client certificate verifier 230 may thus directly transmit and receive a client certificate without using the publish-subscribe communication model.

In the structure illustrated in FIG. 13, a client certificate transmitted by a specific client 100 is not distributed to destinations other than the platform 200. For example, the client 100 may transmit, together with the client certificate, data not intended to be acquired by destinations other than the platform 200. In such a case, the structure illustrated in FIG. 13 can avoid providing data transmitted by the client 100 to destinations other than the platform 200.

Modification 2

Figure 14:
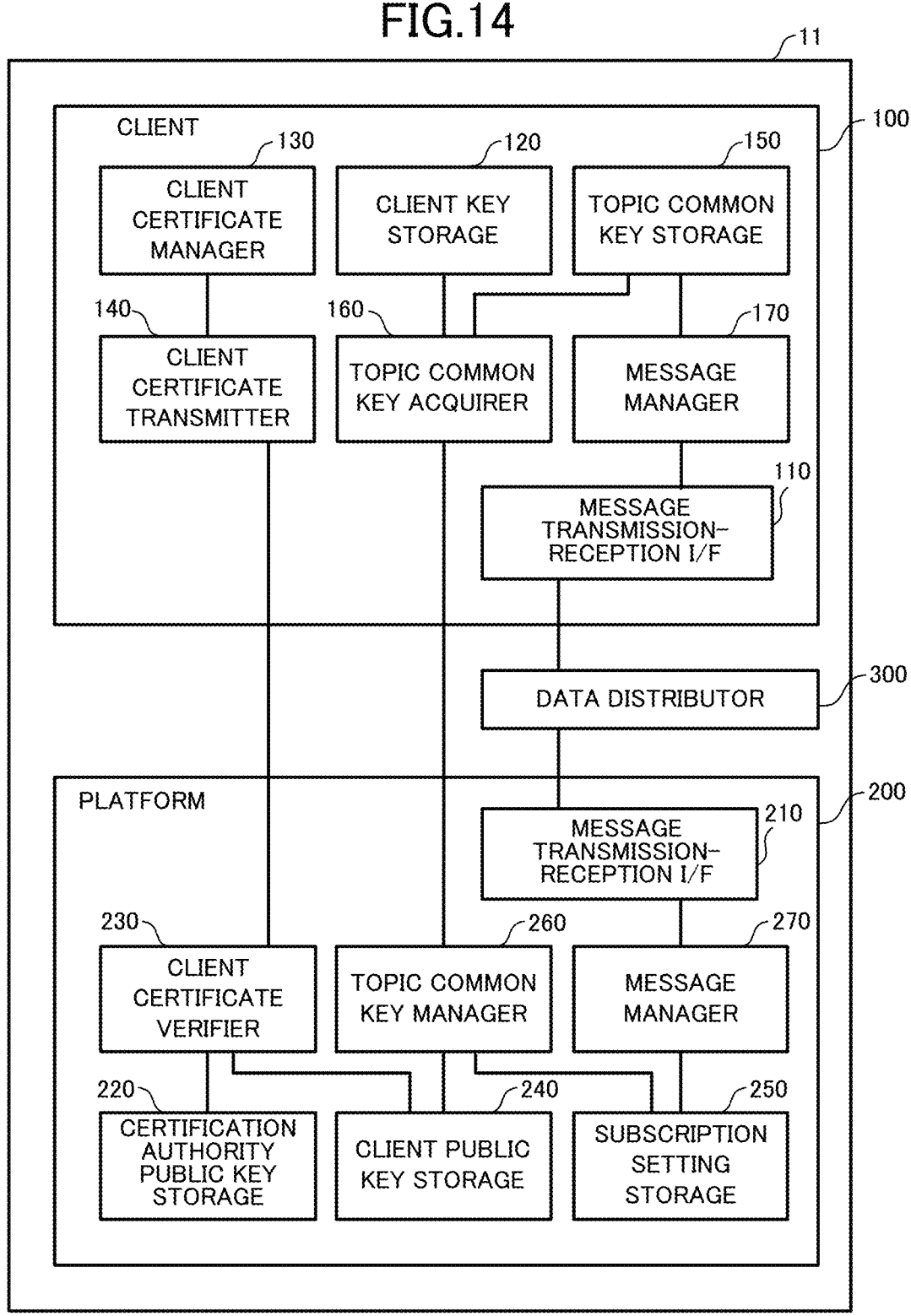
FIG. 14 is a functional block diagram of a data processing apparatus according to Modification 2.

In the embodiment and Modification 1, the platform 200 provides the topic common key to the client 100 through the data distributor 300, but this example is not limitative. For example, as illustrated in FIG. 14, the topic common key manager 260 of the platform 200 and the topic common key acquirer 160 of the client 100 may directly communicate with each other without the data distributor 300. For example, the topic common key manager 260 may directly transmit a file including the topic common key to the topic common key acquirer 160. Thus, the topic common key manager 260 and the topic common key acquirer 160 may directly transmit and receive the topic common key without using the publish-subscribe communication model. The structure illustrated in FIG. 14 can more effectively prevent unauthorized acquirement or misuse of the topic common key.

Modification 3

As illustrated in FIG. 9, in the embodiment, the topic common key manager 260 of the platform 200 includes the topic common key generator 261 and the topic common key storage 262, but this example is not limitative. The topic common key generator 261 and the topic common key storage 262 may be omitted from the topic common key manager 260. Instead of generating the topic common key, the topic common key manager 260 acquires the topic common key from storage means included in another computer. For example, after the platform 200 is activated, the topic common key transmitter 263 may acquire a topic common key stored in another computer and provide the acquired topic common key to the client 100. The data processing apparatus 10 can communicate with another computer through a network.

Modification 4

In the embodiment, the client certificate stored in the client certificate manager 130 is preinstalled in an application that implements the functions of the client 100, but this example is not limitative.

The client certificate manager 130 may acquire the client certificate from a certification authority. For example, the client certificate manager 130 requests the signature of the certificate from the certification authority immediately after activation of the client 100. The data processing apparatus 10 can communicate with the certification authority through an external network. An example of the external network is an open network such as the Internet. The client 100 transmits the public key of the client 100 stored in the client key storage 120 and the identification information of the client 100 that identifies the client 100 as the owner of the public key to the certification authority, and requests the signature of the certificate.

When determining that the signature may be affixed to the certificate of the client 100 based on the identification information of the client 100, the certification authority generates the signature based on the identification information and the public key received from the client 100. For example, to generate the signature, the certification authority generates a hash value based on the identification information and the public key of the client 100 and encrypts the hash value with a secret key of the certification authority. The encrypted hash value serves as the signature of the certification authority. The certification authority provides the client certificate including the signature added to the identification information and the public key of the client 100 to the client 100. The client certificate manager 130 stores the client certificate provided from the certification authority.

When the data processing apparatus 10 can communicate with the certification authority through an external network and when the client certificate verifier 230 of the platform 200 fails to verify the client certificate, the public key may be acquired from the certification authority through the external network and the client certificate verifier 230 may verify the client certificate with the acquired public key of the certification authority. For example, the certification authority available to the client 100 may be changed or may not be preregistered with the platform 200. In such a case, the client certificate verifier 230 of the platform 200 may track a certificate chain. When a route certification authority successfully performs verification, the client certificate verifier 230 determines that the client certificate is successfully verified. Stepwise certification with the certificate chain can improve the security.

In the embodiment, the platform 200 operates as a publisher and each client 100 operates as a subscriber, but this example is not limitative. For example, one client 100 may operate as a publisher, and the platform 200 and another client 100 may operate as subscribers. Different topics may be defined by different publishers. For example, the publisher of the topic T1 may be the platform 200, and the publisher of the topic T2 may be the client 100. One topic may be defined by two or more publishers. In the above cases as well, the platform 200 generates and distributes the topic common key.

In the embodiment, when failing to decrypt the topic common key, or in other words, upon receiving a topic common key encrypted with the public key of another client 100, the client 100 abandons the topic common key. Thus, the client 100 can acquire the topic common key alone directed to the client 100. Instead, the platform 200 may add the identification information of the directed client 100 to the message including the encrypted topic common key. The client can determine whether the message is directed to the client based on the identification information included in the message.

Figure 15:
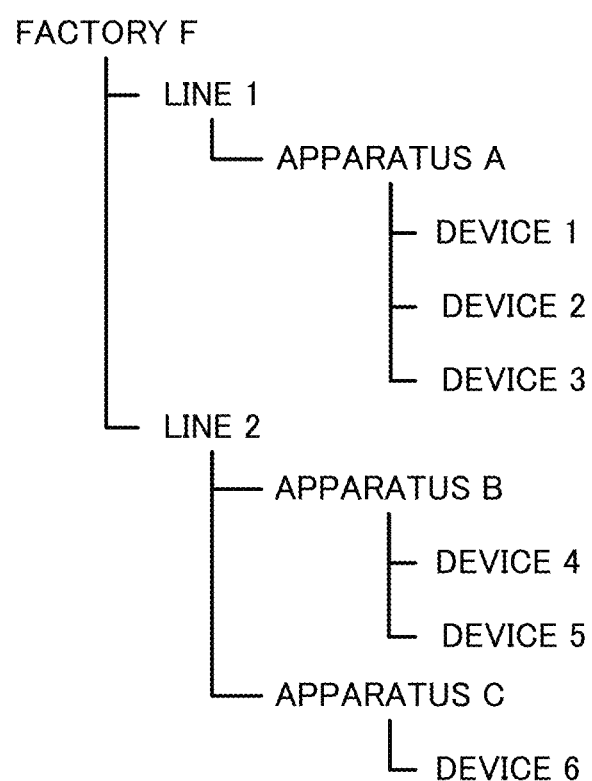
FIG. 15 is a diagram of example data having a hierarchical structure.

Each topic may have a hierarchical structure. For example, data collected by the data processing apparatus 10 has the hierarchical structure illustrated in FIG. 15. For example, the data collected by a device 1 is defined as one topic. The device 1 is installed in an apparatus A on a line 1 in a factory F. This topic can be expressed as, for example, factory F/line 1/apparatus A/device 1. A subscriber may specify the topic on the lowermost layer when requesting subscription to the topic from a broker. For example, a subscriber may specify factory F/line 1/apparatus A/device 1. The broker distributes data collected from the device 1 to the subscriber. The subscriber may specify the topic on an upper layer when requesting the topic subscription. For example, the subscriber may specify factory F/line 1/apparatus A. The broker distributes data collected from devices 1, 2, and 3 to the subscriber.

The topic common key may not be prepared for each topic. For example, the platform 200 may generate a topic common key for a topic on an upper layer and use the same topic common key for a topic on the lower layer. For example, the platform 200 generates a topic common key for factory F/line 1. The same topic common key is provided to a subscriber subscribing to the topic on the device 1, a subscriber subscribing to the topic on the device 2, and a subscriber subscribing to the topic on the device 3.

As described above, the platform 200 can add the identification information of the directed client 100 to the message including the topic common key. For example, the platform 200 may specify the destination in the manner described below. The platform 200 defines topics classified with the identification information of the directed client. When the clients 101 and 102 subscribe to the topic T1, the platform 200 defines the topics as topic T1/client 101 and topic T1/client 102. To transmit the topic common key to the client 101, the platform 200 specifies topic T1/client 101 and transmits the message. To transmit the topic common key to the client 102, the platform 200 specifies topic T1/client 102 and transmits the message.

In the embodiment, the subscription setting storage 250 of the platform 200 prestores information on the client 100 authorized to subscribe to a topic, but this example is not limitative. The subscription setting storage 250 may be omitted from platform 200. For example, the client 100 may store information of a subscribing topic and transmit the information for identification of the subscribing topic together with the client certificate to the platform 200. The platform 200 may transmit the topic common key to be used to the client 100 based on the information for identification of the topic received together with the client certificate.

In the embodiment, the data processing apparatus 10 includes the clients 101 and 102, the platform 200, and the data distributor 300, but this example is not limitative. For example, the functions of the clients 101 and 102, the platform 200, and the data distributor 300 may be implemented by four computers that can communicate with one another through a network.

For example, an application that operates on a server provided by an external system provider may function as the data distributor 300 serving as a broker. A cloud service may function as a broker.

In the embodiment, the data processing apparatus 10 includes the client 101 that collects data and the client 102 that analyzes the collected data, but this example is not limitative.

For example, the data processing apparatus 10 may further include a client 103 that provides feedback based on the analysis result to each FA device 600. The client 102 issues a message including data indicating the analysis result, and the client 103 subscribes to the message. For example, the client 103 diagnoses the FA device 600 based on data indicating the analysis result included in the received message and controls the FA device 600 based on the diagnosis result. For example, to diagnose a programmable logic controller serving as the FA device 600 and control the programmable logic controller based on the diagnosis result, the client 103 may write values to be used to control the programmable logic controller in a specific memory area in the programmable logic controller.

As described above, a publisher of the data processing apparatus 10 encrypts data with a topic common key unique to each topic and publishes encrypted data. For example, although using an external server or a cloud service as a broker increases the likelihood of data leakage, transmission and reception of encrypted data enables a publisher and a subscriber to safely exchange data.

Examples of a non-transitory recording medium that records the above programs include a non-transitory computer-readable recording medium, such as a magnetic disk, an optical disk, a magneto-optical disk, a flash memory, a semiconductor memory, and magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

B1 Broker
P1, P2 Publisher
S1, S2 Subscriber
1 Data processing system
T1, T2, T3 Topic
M1, M2 Message
10 Data processing apparatus
11 CPU
12 Memory
13 Communication interface
14 Input device
15 Output device
19 Bus
101, 102 (100) Client
110, 210 Message transmission-reception I/F
120 Client key storage
130 Client certificate manager
140 Client certificate transmitter
150, 262 Topic common key storage
160 Topic common key acquirer
170, 270 Message manager
200 Platform
220 Certification authority public key storage
230 Client certificate verifier
240 Client public key storage
250 Subscription setting storage
260 Topic common key manager
261 Topic common key generator
263 Topic common key transmitter
300 Data distributor
601, 602 (600) FA device
701 Network

The invention claimed is:

1. A data distribution system comprising a memory that stores computer-readable instructions and processing circuitry that, when executing the computer-readable instructions, is configured to implement a plurality of clients that communicate with each other in accordance with a publish-subscribe model, the plurality of clients including a first client and at least one second client, wherein
the first client includes
a topic common key manager to provide, to the at least one second client, a topic common key associated with a topic specifying a destination of a message and being for encryption and decryption of the message directed to the topic, and a message manager to (i) transmit to the topic the message encrypted with the topic common key associated with the topic and (ii) decrypt, upon receiving the message directed to the topic, the received message with the topic common key associated with the topic, and the at least one second client includes a storage to store the topic common key provided from the first client in association with identification information for identification of the topic, and a message manager to (i) transmit to the topic the message encrypted with the topic common key and (ii) decrypt, upon receiving the message directed to the topic, the received message with the topic common key, wherein the first client includes a topic common key storage to store the topic common key in association with the identification information for identification of the topic, the topic common key manager of the first client provides the topic common key to a second client, of the at least one second client, set as a publisher of the topic and a second client, of the at least one second client, set as a subscriber of the topic, the at least one second client includes a client-certificate transmitter to transmit, to the first client, a client certificate certifying that the at least one second client is an authorized client, the first client includes a client certificate verifier to verify the client certificate received from the client-certificate transmitter of the at least one second client, and the topic common key manager of the first client provides the topic common key associated with the topic published or subscribed to by the at least one second client when the client certificate verifier successfully verifies the client certificate received from the client-certificate transmitter of the at least one second client.

2. The data distribution system according to claim 1, wherein the message manager of the second client set as the publisher of the topic encrypts the message with the topic common key associated with the topic and transmits the encrypted message, thereby publishing the message to the topic.

3. The data distribution system according to claim 2, wherein the message manager of the second client set as the subscriber of the topic decrypts, upon receiving the message directed to the topic subscribed to thereby, the message with the topic common key associated with the topic.

4. The data distribution system according to claim 1, wherein a signature is affixed to the client certificate by a certification authority, and the client certificate verifier of the first client verifies the signature affixed to the client certificate with a public key of the certification authority.

5. The data distribution system according to claim 4, wherein, when the client certificate verifier successfully verifies the signature affixed to the client certificate, the topic common key manager of the first client encrypts the topic common key with a client public key that is a public key of the at least one second client, and provides the encrypted topic common key to the at least one second client.

6. The data distribution system according to claim 5, wherein the client certificate includes the client public key of the at least one second client, and the topic common key manager of the first client encrypts the topic common key with the client public key acquired from the client certificate when the client certificate verifier successfully verifies the signature affixed to the client certificate.

7. The data distribution system according to claim 1, further comprising:

a mediator to receive the message published to the topic by a client set as a publisher of the topic and to distribute the message to a client set as a subscriber of the topic, the client set as the publisher of the topic being the first client or a second client of the at least one second client, the client set as the subscriber of the topic being the first client or a second client of the at least one second client.

8. The data distribution system according to claim 1, wherein the topic common key storage of the first client stores the topic common key associated with the topic in association with the identification information for identification of the topic.

9. The data distribution system according to claim 1, wherein the topic common key storage of the first client stores the topic common key associated with two or more of the topics in association with the identification information for identification of each of the topics.

10. The data distribution system according to claim 1, wherein the topic common key manager generates the topic common key and stores the generated topic common key into the topic common key storage.

11. The data distribution system according to claim 1, wherein the first client and the at least one second client directly communicate with each other.

12. The data distribution system according to claim 1, wherein the topic is one of a plurality of topics arranged in a hierarchical order.

13. The data distribution system according to claim 12, wherein the topic common key is usable to access the topic and topics of the plurality of topics that are lower than the topic in the hierarchical order.

14. A data processing apparatus comprising:

a plurality of clients including a first client and at least one second client, the plurality of clients being configured to communicate with each other in accordance with a publish-subscribe model, wherein the first client includes a topic common key manager to provide, to the at least one second client, a topic common key associated with a topic specifying a destination of a message and being for encryption and decryption of the message directed to the topic, and a message manager to (i) transmit to the topic the message encrypted with the topic common key associated with the topic and (ii) decrypt, upon receiving the message directed to the topic, the received message with the topic common key associated with the topic, and the at least one second client includes a storage to store the topic common key provided from the first client in association with identification information for identification of the topic, and a message manager to (i) transmit to the topic the message encrypted with the topic common key and (ii) decrypt, upon receiving the message directed to the topic, the received message with the topic common key, wherein the first client includes a topic common key storage to store the topic common key in association with the identification information for identification of the topic, the topic common key manager of the first client provides the topic common key to a second client, of the at least one second client, set as a publisher of the topic and a second client, of the at least one second client, set as a subscriber of the topic, the at least one second client includes a client-certificate transmitter to transmit, to the first client, a client certificate certifying that the at least one second client is an authorized client, the first client includes a client certificate verifier to verify the client certificate received from the client-certificate transmitter of the at least one second client, and the topic common key manager of the first client provides the topic common key associated with the topic published or subscribed to by the at least one second client when the client certificate verifier successfully verifies the client certificate received from the client-certificate transmitter of the at least one second client.

15. A non-transitory recording medium storing a program for causing a computer to perform operations, the computer being configured to function, in a data distribution system in which a plurality of clients communicate with each other in accordance with a publish-subscribe model, as one client of the plurality of clients, the operations comprising:

transmitting a message to a topic specifying a destination of the message by encrypting the message with a topic common key associated with the topic and transmitting the encrypted message to the topic;

decrypting, upon receiving the message directed to the topic, the received message with the topic common key associated with the topic;

storing the topic common key in association with the identification information for identification of the topic;

providing the topic common key to a second client set as a publisher of the topic and a third client set as a subscriber of the topic;

receiving a client certificate from another client, the client certificate certifying that the other client is an authorized client;

verifying the client certificate receive from the other client; and providing the topic common key associated with the topic to the other client when the client certificate received from the other client is successfully verified.

* * * * *